US012308732B2

(12) United States Patent
Akatsuki et al.

(10) Patent No.: US 12,308,732 B2
(45) Date of Patent: May 20, 2025

(54) DCDC CONVERTER, INTEGRATED CIRCUIT, AND TARGET VOLTAGE GENERATION CIRCUIT

(71) Applicant: SANKEN ELECTRIC CO., LTD., Niiza (JP)

(72) Inventors: Kenji Akatsuki, Niiza (JP); Takaaki Nojima, Niiza (JP); Masaru Nakamura, Niiza (JP)

(73) Assignee: SANKEN ELETRIC CO., LTD., Niiza (JP)

( * ) Notice: Subject to any disclaimer, the term of this patent is extended or adjusted under 35 U.S.C. 154(b) by 248 days.

(21) Appl. No.: 18/320,308

(22) Filed: May 19, 2023

(65) Prior Publication Data

US 2023/0402911 A1 Dec. 14, 2023

(30) Foreign Application Priority Data

Jun. 8, 2022 (JP) ................................ 2022-092763

(51) Int. Cl.
*H02M 1/00* (2007.01)
*H02M 3/158* (2006.01)

(52) U.S. Cl.
CPC ......... *H02M 1/0025* (2021.05); *H02M 3/158* (2013.01)

(58) Field of Classification Search
CPC ..... H02M 1/0025; H02M 3/158; H02M 3/156
See application file for complete search history.

(56) References Cited

U.S. PATENT DOCUMENTS

2003/0067344 A1* 4/2003 Nanba ..................... G01K 7/24
374/E7.031
2011/0069960 A1* 3/2011 Knapp ................. H04L 12/437
398/103

FOREIGN PATENT DOCUMENTS

JP 5590240 B2 9/2014
WO 2013/005520 A1 1/2013

\* cited by examiner

*Primary Examiner* — Adolf D Berhane
*Assistant Examiner* — Afework S Demisse
(74) *Attorney, Agent, or Firm* — METROLEX IP LAW GROUP, PLLC; Robert L. Scott, Esq.

(57) ABSTRACT

A direct current to direct current converter is disclosed that controls an output voltage based on an error signal between a feedback voltage and a target voltage. A direct current to direct current converter according to one or more embodiments may include a temperature sensor, a reference voltage generator circuit that generates a reference voltage, a compensation calculator that calculates a compensation value from a temperature detected from the temperature sensor using a function of temperature, a compensator that corrects a target initial value by the compensation value to generate the target value, and a digital-to-analog converter that converts the target value to the target voltage based on the reference voltage.

11 Claims, 5 Drawing Sheets

DCDC CONVERTER, INTEGRATED CIRCUIT, AND TARGET VOLTAGE GENERATION CIRCUIT

CROSS REFERENCE TO RELATED APPLICATIONS

This application claims priority to prior Japanese Patent Application No. 2022-092763 filed with the Japan Patent Office on Jun. 8, 2022, the entire contents of which are incorporated herein by reference.

BACKGROUND

The disclosure relates to a DCDC converter that uses a reference voltage source.

Direct current to direct current converters (DCDC converter) commonly use a band gap reference circuit as a reference voltage to generate a stable reference voltage.

However, since the band gap reference circuit has slight temperature characteristics, an output voltage of the DCDC converter also has a temperature dependence. In recent years, the DCDC converter requires a highly accurate power supply voltage for System-on-chip (SoC) or Field-programmable gate array (FPGA) that serves as a load. Therefore, the slight temperature dependence of the DCDC converter makes it difficult to meet the required accuracy of the load, which requires the highly accurate power supply voltage.

As a technique for improving temperature characteristics, a content of improving the temperature dependence of an output current by controlling according to a value of a temperature sensor based on a coefficient stored in a flash memory in advance is disclosed.

The related art disclosed in Japanese Patent No. 5590240 (Patent Document 1) may not optimally perform temperature compensation when the temperature characteristics themselves vary. Since the contents of Patent Document 1 are limited to an output current source, the temperature characteristics of the output voltage of the DCDC converter may not be improved.

SUMMARY

A direct current to direct current converter according to one or more embodiments that controls an output voltage based on an error signal between a feedback voltage and a target voltage may include a temperature sensor, a reference voltage generator circuit that generates a reference voltage, a compensation calculator that calculates a compensation value from a temperature detected from the temperature sensor using a function of temperature, a compensator that corrects a target initial value by the compensation value to generate the target value, and a digital-to-analog converter that converts the target value to the target voltage based on the reference voltage.

An integrated circuit according to one or more embodiments that controls an output voltage of a direct current to direct current converter based on an error signal between a feedback voltage and a target voltage may include a temperature sensor, a reference voltage generator circuit that generates a reference voltage, a compensation calculator that calculates a compensation value from a temperature detected from the temperature sensor using a quadratic function of temperature, a compensator that corrects a target initial value by the compensation value to generate the target value, and a digital-to-analog converter that converts the target value to the target voltage based on the reference voltage.

A target voltage generation circuit according to one or more embodiments that generates a target voltage to be compared with a feedback voltage may include a reference voltage generator circuit that generates a reference voltage, a compensation calculator that calculates a compensation value from a temperature detected from a temperature sensor using a quadratic function of temperature, a compensator that corrects the target initial value by the compensation value to generate a target value, and a digital-to-analog converter that converts the target value to the target voltage.

A DCDC converter according to one or more embodiments may output an output voltage as a highly accurate power supply voltage for SoC, FPGA, etc. because a target voltage used to generate an error signal with a feedback voltage is corrected by a compensation value calculated using a quadratic function of temperature. As a result, a DCDC converter that may output a highly accurate power supply voltage may be provided.

DETAILED DESCRIPTION

Figure 1:
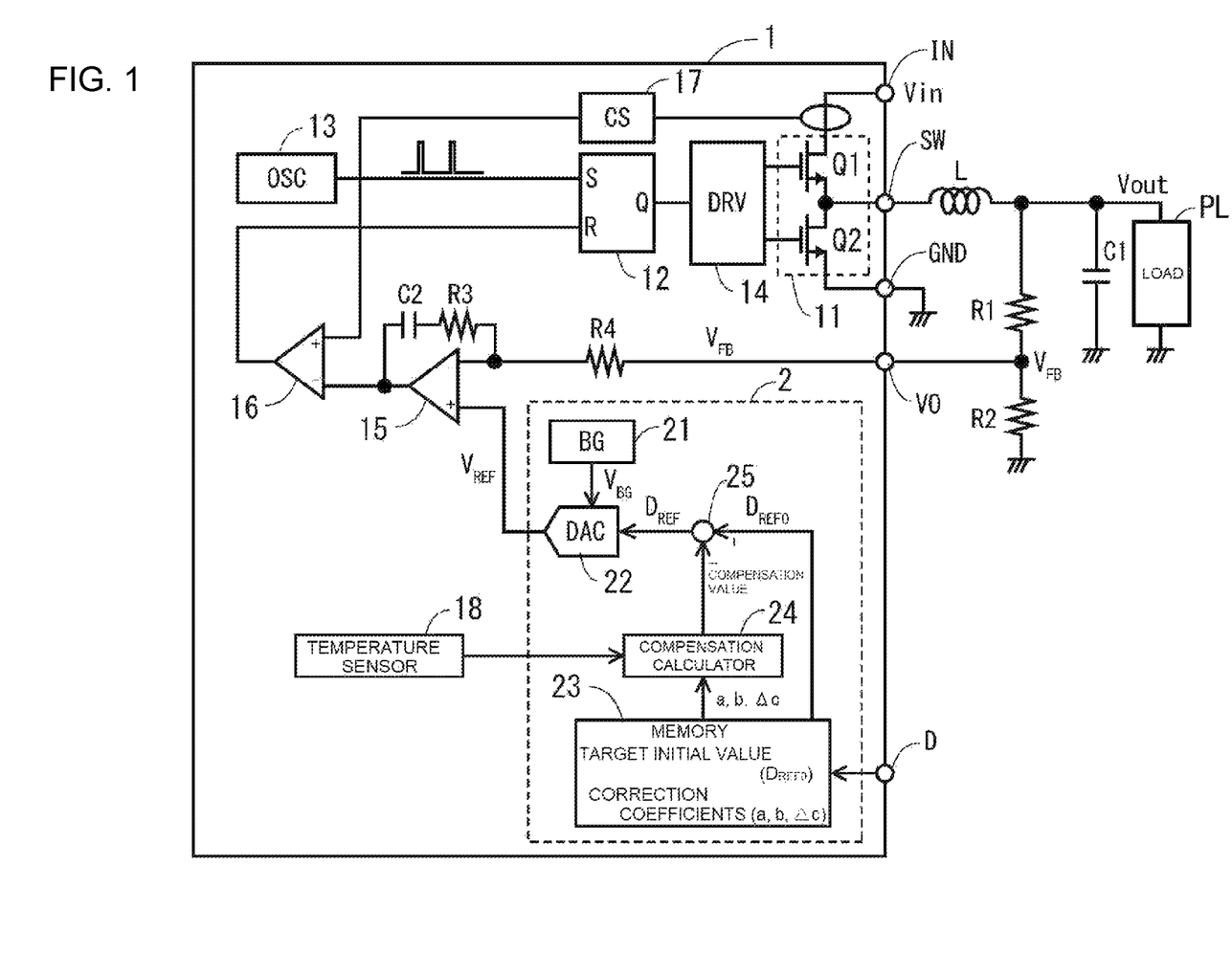
FIG. 1 is a diagram illustrating a configuration of a DCDC converter according to one or more embodiments.

A DCDC converter, an integrated circuit and a target voltage generation circuit according to one or more embodiments are described below based on the accompanying drawings. Referring to FIG. 1, a DCDC converter according to one or more embodiments includes a control circuit 1, a reactor L, a capacitor C1, a resistor R1, and a resistor R2, and converts an input voltage Vin to an output voltage Vout to output to a load PL.

The control circuit 1 includes an integrated circuit such as a switching regulator IC with a built-in switching element including a power metal-oxide-semiconductor field-effect transistor (power MOSFET), etc. The control circuit 1 includes an input terminal IN, a ground terminal GND, a switching output terminal SW, a feedback voltage input terminal VO, and a data input terminal D.

The control circuit 1 includes a series circuit 11, in which a switch Q1 and a switch Q2 are connected in series. The switch Q1 and the switch Q2 include switching elements such as power MOSFETs, etc. The series circuit 11 is connected between the input terminal IN, to which the input voltage Vin is input, and the ground terminal GND, which is connected to a ground potential (ground: GND). The switch Q1 is provided on an input terminal IN side (high potential side), and the switch Q2 is provided on a ground terminal GND side (low potential side). A connection point between the switch Q1 and the switch Q2 is connected to the switching output terminal SW.

The switching output terminal SW of the control circuit 1 is connected to the ground potential via the reactor L and the capacitor C1, and a connection point between the reactor L and the capacitor C1 is an output terminal of the output voltage Vout.

The resistor R1 and the resistor R2 are connected between a connection point of the reactor L and the capacitor C1 and the ground potential. The connection point between the resistor R1 and the resistor R2 is connected to the feedback voltage input terminal VO of the control circuit 1. A voltage obtained by dividing the output voltage Vout by the resistor R1 and the resistor R2 is input to the feedback voltage input terminal VO as a feedback voltage $V_{FB}$.

The control circuit 1 includes a flip-flop 12, an oscillation circuit (OSC) 13, a drive circuit (DRV) 14, an amplifier 15, a comparator 16, a current detection circuit (CS) 17, a temperature sensor 18, and a target voltage generation circuit 2.

The flip-flop 12 may be an RS type. An output of the flip-flop 12 (output terminal Q) is input to the drive circuit 14, and the drive circuit 14 controls the switch Q1 and the switch Q2 on/off according to the output of the flip-flop 12.

In the flip-flop 12, a clock signal from the oscillation circuit 13 is input to a set terminal S. The clock signal generated by the oscillation circuit 13 is a signal that defines a switching cycle. When the flip-flop 12 is set by the clock signal from the oscillation circuit 13, the drive circuit 14 controls the switch Q1 ON and controls the switch Q2 OFF.

The feedback voltage $V_{FB}$ input to the feedback voltage input terminal VO is input to an inverting input terminal of the amplifier 15 through a resistor R4. The amplifier 15 is a differential amplifier whose output is negatively feedbacked via the capacitor C2 and the resistor R3. The amplifier 15 outputs an error amplified signal between the feedback voltage $V_{FB}$ and the target voltage $V_{REF}$ at a non-inverting input terminal.

The error amplified signal between the feedback voltage $V_{FB}$ and the target voltage $V_{REF}$ is input to the inverting input terminal of the comparator 16. The non-inverting input terminal of the comparator 16 is input with a current signal detected by the current detection circuit 17. The current detection circuit 17 detects a current flowing through the switch Q1 on a high side and inputs the current as a current signal to the non-inverting input terminal of the comparator 16.

The flip-flop 12 is reset when the output of comparator 16 is input to the reset terminal R and the current signal exceeds the error amplification signal. When the flip-flop 12 is reset, the drive circuit 14 controls the switch Q1 off and the switch Q2 on. As a result, the DCDC converter operates in peak current mode control.

The target voltage generation circuit 2 generates the target voltage $V_{REF}$ to be input to the non-inverting input terminal of the amplifier 15. The target voltage generation circuit 2 includes a bandgap reference circuit (BG circuit) 21, a digital to analog converter (DAC) 22, a memory 23, a compensation calculator 24, and a subtractor 25.

DAC22 converts the target value $D_{REF}$ to the target voltage $V_{REF}$ using the reference voltage $V_{BG}$ generated by the BG circuit 21 and outputs the target voltage $V_{REF}$ to the non-inverting input terminal of amplifier 15.

The BG circuit 21 is a reference voltage generation circuit that generates a stable reference voltage $V_{BG}$ using the temperature characteristics of the pn junction of the transistor, but has slight temperature characteristics.

The DCDC converter cancels the slight temperature characteristics of the BG circuit 21 by using a target value $D_{REF}$ that is compensated by a compensation value. The compensation value is generated by the compensation calculator 24 based on the temperature T detected by the temperature sensor 18.

Temperature sensor 18 is a sensor circuit that detects temperature. The temperature sensor 18 outputs a temperature detection voltage (such as a voltage between a base and an emitter of a bipolar transistor) generated by using a circuit element with temperature dependence to the compensation calculator 24 as a temperature detection voltage. The temperature sensor 18 is arranged in the control circuit 1 and at a position where the temperature of the BG circuit 21 may be accurately detected.

Figure 2:
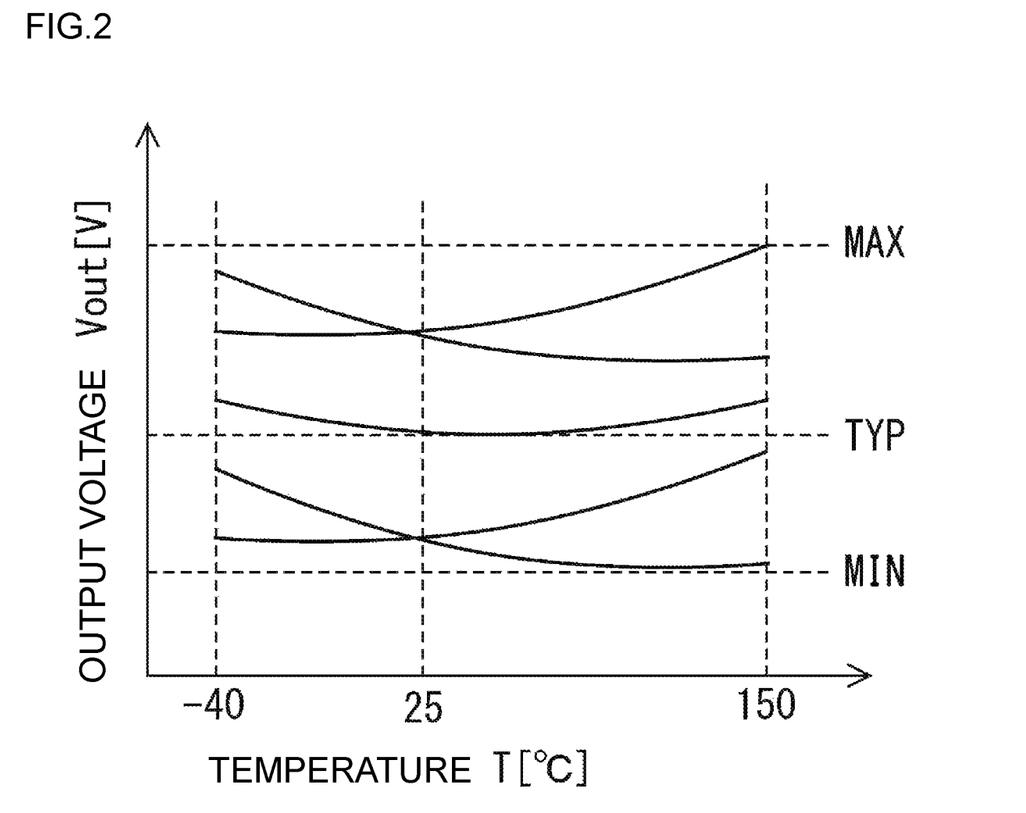
FIG. 2 is a diagram illustrating a variation in an output voltage.

As shown in FIG. 2, the output voltage Vout of DCDC converters has absolute value variations due to device variations and other factors, and has different temperature characteristics. FIG. 2 shows graphs of the output voltage Vout of five DCDC converters, each measured in the range of −40° C. to 150° C. The temperature characteristics of the output voltage Vout show a tendency to increase in the low and high temperature ranges.

The relationship between the feedback voltage $V_{FB}$ (output voltage Vout) and temperature T is modeled by a quadratic function formula as shown below in Equation EQ (1). In EQ (1), coefficients a and b are temperature characteristic coefficients, and coefficient c is the extreme value of feedback voltage $V_{FB}$ $$V_{FB}=aT^2+bT+c \quad (1)$$

EQ (1)

By transforming EQ (1), the temperature characteristic correction formula is given by EQ (2).

$$\text{Compensation value}=aT^2+bT+\Delta c \quad (2)$$

EQ (2)

In EQ (2), $\Delta c$ is an offset coefficient and is stored into memory 23 from data input terminal D as a correction coefficient together with temperature characteristic coefficients a and b. The correction coefficients a, b, and $\Delta c$ are values obtained by actual measurement.

Memory 23 includes a memory section, such as a flash memory or the like, in which the target initial value $D_{REF0}$ is stored together with the correction coefficients a, b, and $\Delta c$. The target initial value $D_{REF0}$ and the correction coefficients a, b, and $\Delta c$ may be stored in different locations.

Figure 3:
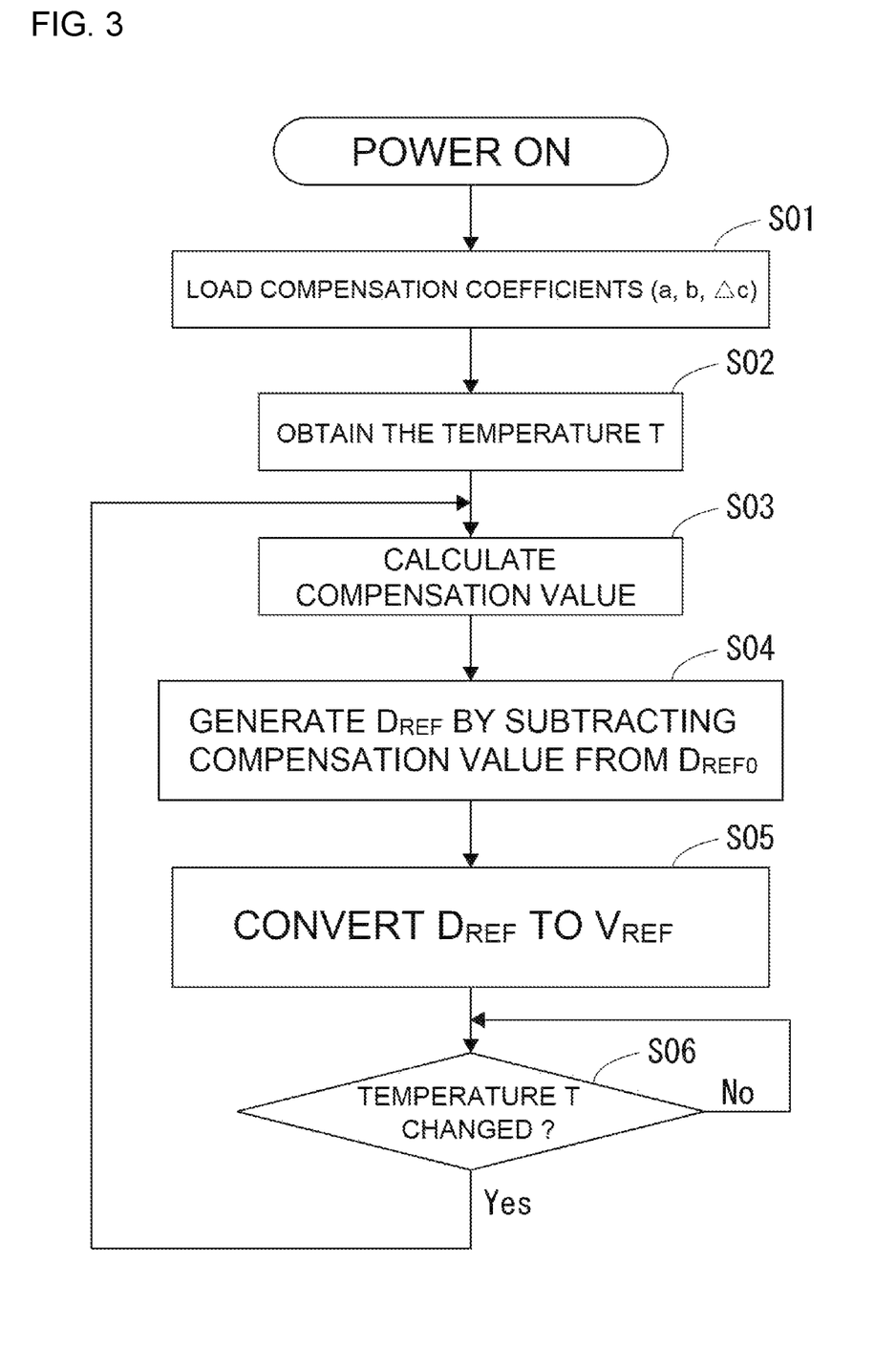
FIG. 3 is a flowchart illustrating an operation of a target voltage generation circuit illustrated such as is in FIG. 1.

Referring to FIG. 3, the compensation calculator 24 loads the correction coefficients a, b, and $\Delta c$ upon power-on (step S01). Next, the compensation calculator 24 obtains the temperature T input from the temperature sensor 18 (step S02) and calculates the compensation value using the formula EQ (2) (step S03).

The subtractor 25 loads the target initial value $D_{REF0}$ stored in the memory 23 and generates the target value $D_{REF}$ by subtracting the compensation value calculated by the compensation calculator 24 from the target initial value $D_{REF0}$ (step S04). In other words, subtractor 25 functions as a compensator to generate the target value $D_{REF}$ by compensating the target initial value $D_{REF0}$ with the compensation value. The target value DRE is given by EQ (3).

$$D_{REF} = D_{REF0} - \text{compensation value} \quad (3)$$

EQ (3)

DAC22 converts the target value $D_{REF}$ to the target voltage $V_{REF}$ by using the reference voltage $V_{BG}$ generated by the BG circuit 21 and multiplying it by the DA conversion factor (step S05). The target value $D_{REF}$ is given by EQ (3). The target voltage $V_{REF}$ is given by EQ (4).

$$V_{REF} = D_{REF} \times DA \text{ conversion factor} \quad (4)$$

EQ (4)

The compensation calculator 24 monitors the change in temperature T input from the temperature sensor 18 at predetermined intervals (step S06). If there is a change in temperature T, the compensation calculator 24 returns to step S03 and calculates a compensation value based on the temperature T that has changed. In this way, the target voltage $V_{REF}$ is changed as the temperature T changes to accommodate changes in temperature T during operation.

The correction coefficients a, b, and Δc are determined in the IC inspection process before shipment and stored in memory 23. The IC inspection process is a state in which only the target initial value $D_{REF0}$ is stored in memory 23. When the DCDC converter is operated in the IC inspection process, DAC 22 converts the target initial value $D_{REF0}$ to the target initial voltage $V_{REF0}$ and the DCDC converter is controlled by the error amplification signal between the feedback voltage $V_{FB}$ and the target initial voltage $V_{REF0}$ Referring to FIG. 4, the DCDC converter is operated in a low-temperature environment (e.g., at the lower limit of the rated temperature) at a temperature $T_1$ and the feedback voltage $V_{FB1}$ is measured (step S11).

Figure 4:
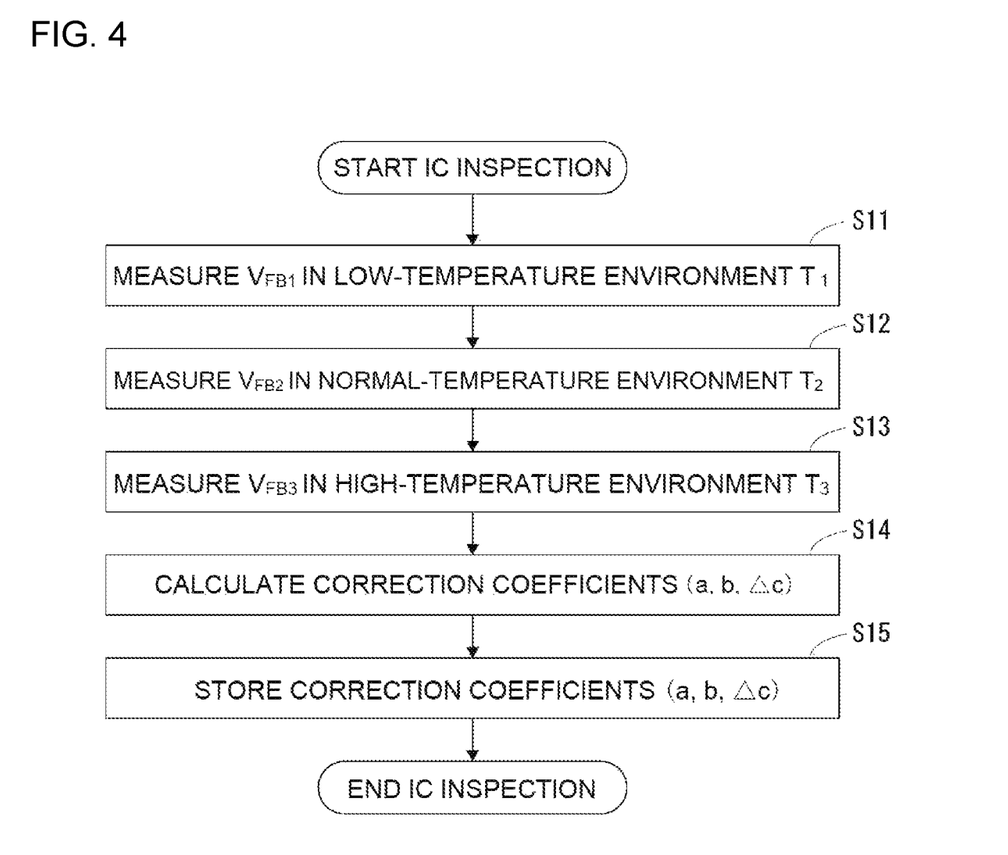
FIG. 4 is a flowchart illustrating a configuration of an IC inspection.

Next, the DCDC converter is operated in a normal temperature environment (e.g., room temperature) at a temperature $T_2$ and the feedback voltage $V_{FB2}$ is measured (step S12).

Next, the DCDC converter is placed in a high-temperature environment (e.g., the upper limit of the rated temperature) at a temperature $T_3$ and operated to measure the feedback voltage $V_{FB3}$ (step S13). The measurement time can be shortened by performing the measurements in the order of low temperature-normal temperature-high temperature, but there are no restrictions on the order of the measurements.

Next, the correction coefficients a, b, and Δc are calculated by using the feedback voltages $V_{FB1}$ at temperature $T_1$, $V_{FB2}$ at temperature $T_2$, and $V_{FB3}$ at temperature $T_3$ (step S14). The temperatures $T_1$, $T_2$, and $T_3$ may be the values detected by the temperature sensor 18. In this case, a temperature output terminal that outputs the temperature T detected by the temperature sensor 18 can be provided in the control circuit 1 to measure the temperatures $T_1$, $T_2$, and $T_3$ along with the feedback voltages $V_{FB1}$, $V_{FB2}$, and $V_{FB3}$, respectively.

By solving the simultaneous equations in sEQ (1), the temperature characteristic coefficients a, b, and c are calculated by the following equations EQ (5), (6), and EQ (7).

EQ(5)
$$a = \frac{(V_{FB1} - V_{FB2})(T_1 - T_3) - (V_{FB1} - V_{FB3})(T_1 - T_2)}{(T_1^2 - T_2^2)(T_1 - T_3) - (T_1^2 - T_3^2)(T_1 - T_2)}. \quad (5)$$

EQ(6)
$$b = \frac{(V_{FB1} - V_{FB2}) - a(T_1^2 - T_2^2)}{(T_1 - T_2)}. \quad (6)$$

EQ(7)
$$c = V_{fb1} - \frac{(V_{fb1} - V_{fb2})(T_1 - T_3) - (V_{fb1} - V_{fb3})(T_1 - T_2)}{(T_1^2 - T_2^2)(T_1 - T_3) - (T_1^2 - T_3^2)(T_1 - T_2)} T_1^2 - \frac{(V_{fb1} - V_{fb2}) - \frac{(V_{fb1} - V_{fb2})(T_1 - T_3) - (V_{fb1} - V_{fb3})(T_1 - T_2)}{(T_1^2 - T_2^2)(T_1 - T_3) - (T_1^2 - T_3^2)(T_1 - T_2)}(T_1^2 - T_2^2)}{(T_1 - T_2)} T_1. \quad (7)$$

The offset coefficient Δc is the difference between the feedback voltage $V_{FB2}$ and the target initial voltage $V_{REF0}$ at temperature $T_2$ (room temperature environment), as shown in equation EQ (8). The target initial voltage $V_{REF0}$ is a constant obtained by multiplying the target initial value $D_{REF0}$ by the DA conversion factor of the BG circuit 21.

EQ(8)
$$\Delta c = V_{fb2} - \frac{(V_{fb1} - V_{fb2})(T_1 - T_3) - (V_{fb1} - V_{fb3})(T_1 - T_2)}{(T_1^2 - T_2^2)(T_1 - T_3) - (T_1^2 - T_3^2)(T_1 - T_2)} T_1^2 - \frac{(V_{fb1} - V_{fb2}) - \frac{(V_{fb1} - V_{fb2})(T_1 - T_3) - (V_{fb1} - V_{fb3})(T_1 - T_2)}{(T_1^2 - T_2^2)(T_1 - T_3) - (T_1^2 - T_3^2)(T_1 - T_2)}(T_1^2 - T_2^2)}{(T_1 - T_2)} T_1 - V_{REF0}. \quad (8)$$

On the other hand, since the formulas for calculating c and Δc are very complicated, it is possible to set c to the feedback voltage ($V_{FB2}$) at temperature $T_2$ (normal temperature environment) and Δc to the difference between the feedback voltage ($V_{FB2}$) and the target initial voltage ($V_{REF0}$) in a normal temperature environment, considering the efficiency of calculation and the performance of equipment. A simplified method of calculating Δc in this case is shown in Equation EQ (9). Here, the target initial voltage ($V_{REF0}$) is a constant obtained by multiplying the target initial value ($D_{REF0}$) by the DA change factor of the BG circuit 21.

$$\Delta c = V_{FB2} - V_{REF0} \quad (9)$$

EQ (9)

Next, the correction coefficients a, b, and Δc calculated in step S14 are stored into the memory 23 from the data input terminal D (step S15), and the IC inspection process is completed.

Equations EQ (5), EQ (6), and EQ (7) may also be performed by compensation calculator 24. In this case, by storing the temperatures $T_1$, $T_2$, $T_3$ and the feedback voltages $V_{FB1}$, $V_{FB2}$, $V_{FB3}$ from the data input terminal D to the memory 23, the compensation calculator 24 calculates the correction coefficients a, b and Δc and further calculates the compensation value.

The offset coefficient Δc may be corrected by the re-measured feedback voltage $V_{FB}$ after the correction coefficients a, b, and Δc are stored in memory 23. In this case, the offset coefficient Δc is corrected by the difference between the re-measured feedback voltage $V_{FB}$ and the target initial voltage $V_{REF0}$. This process of correcting the offset coefficient Δc can be continued to the last measurement process of feedback voltages $V_{FB1}$, $V_{FB2}$, and $V_{FB3}$ to reduce the work time.

Figure 5A:
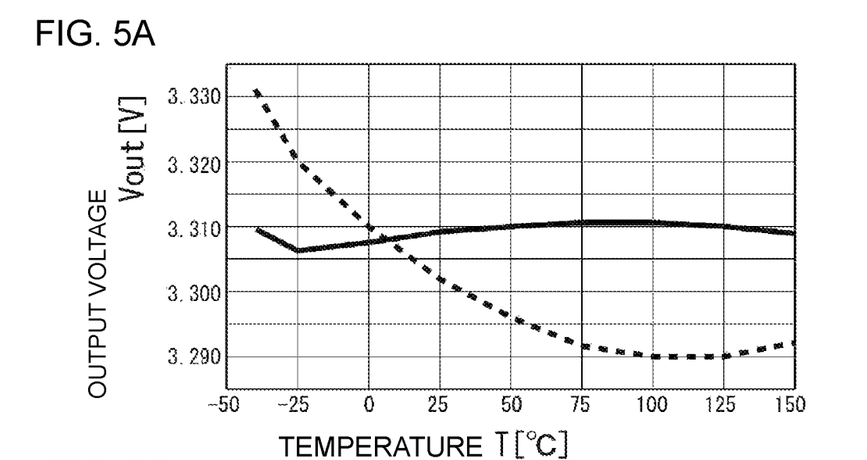
FIGS. 5A, 5B, and 5C are diagrams illustrating comparisons of an output voltage of a controller of a related art and an output voltage of a controller according to one or more embodiments.
Figure 5B:
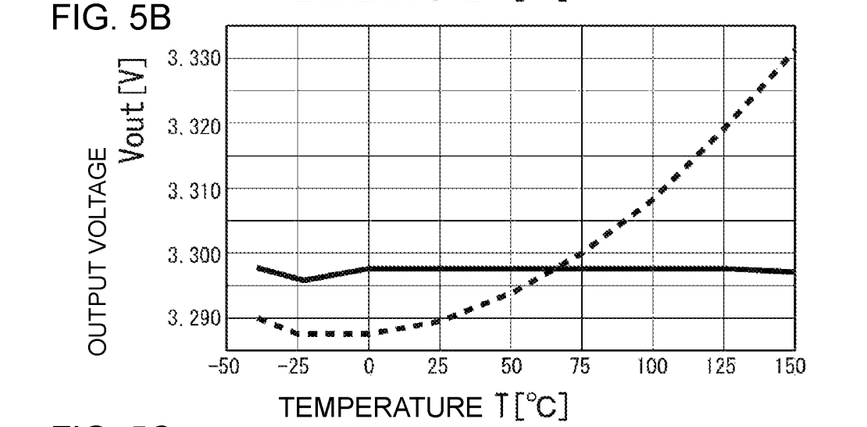
Figure 5C:
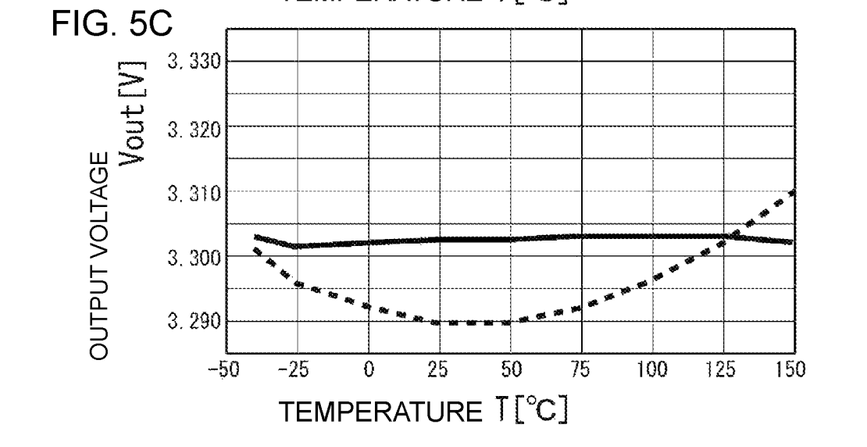

FIGS. 5A, 5B, and 5C each show a graph comparing conventional control using an error amplification signal between the feedback voltage $V_{FB}$ and the target initial voltage $V_{REF0}$ with the control according to one or more embodiments using an error amplification signal between the feedback voltage $V_{FB}$ and the target voltage $V_{REF}$ corrected by the compensation value. In FIGS. 5A, 5B, and 5C, the output voltage Vout output by the conventional control is shown by the dotted line and the output voltage Vout output by the inventive control is shown by the solid line.

As shown in FIGS. 5A, 5B, and 5C, the control operation according to one or more embodiments may cancel the temperature dependence even when temperature characteristics vary with conventional control. Furthermore, since absolute value variations may be compensated at the same time, ultra-high precision output voltage can be generated.

Although one or more embodiments described a DCDC converter (Buck converter) with peak current mode control, the target voltage generation circuit 2 may be applicable to various electronic circuits that use a target voltage $V_{REF}$ (e.g., converters such as other current mode control, voltage mode control, and hysteresis control converters, etc.). In the power supply topologies, various power supply topologies may be applicable, such as Boost converters, SEPIC converters, CUK converters, and Flyback converters.

In one or more embodiments, the feedback voltage $V_{FB}$ is measured to calculate the correction coefficients a, b, and Δc. However, an output terminal for the reference voltage $V_{BG}$ may be provided and the correction coefficients a, b, and Δc may be calculated by directly measuring the reference voltage $V_{BG}$. In this case, the temperature dependence of the output voltage Vout due to the temperature dependence of the reference voltage $V_{BG}$ may be improved. This may be effective when the temperature dependence of the reference voltage $V_{BG}$ is the main cause of the temperature dependence of the output voltage Vout.

As described above, a DCDC converter according to one or more embodiments are that controls an output voltage Vout by an error signal between a feedback voltage $V_{FB}$ and a target voltage $V_{REF}$, may include a temperature sensor 18, a BG circuit 21 (reference voltage generating circuit) that generates a reference voltage $V_{BG}$, and a compensation calculator 24 that calculates a compensation value based on the detected temperature by the temperature sensor 18, a subtractor 25 (compensator) that generates a target value $D_{REF}$ by correcting the target initial value $D_{REF0}$ based on the compensation value, and a DAC 22 (digital-to-analog converter) that converts the target value $D_{REF}$ to a target voltage $V_{REF}$ based on the reference voltage $V_{BG}$. With this configuration, the target voltage $V_{REF}$ for generating the error signal with the feedback voltage $V_{FB}$ is corrected with a compensation value calculated by using a quadratic function of temperature T, so that the output voltage Vout may be output as a highly accurate power supply voltage for such as SoCs and FPGAs.

In addition, in one or more embodiments, a memory 23 is provided in which the coefficients of the quadratic function are stored as correction coefficients a, b, and Δc at the time of pre-shipment inspection, and the compensation calculator 24 calculates compensation values using the correction coefficients a, b, and Δc in the memory 23. This may allow the correction coefficients a, b, and Δc to be stored in accordance with the temperature characteristics of the product during the IC inspection process. Since the compensation calculator 24 can calculate compensation values using the correction coefficients a, b, and Δc for each product, optimal temperature compensation may be achieved for each product. Furthermore, the compensation value calculated using the correction coefficients a, b, and Δc for each product may simultaneously compensate for absolute value variations, thus improving the accuracy of the total output voltage Vout.

Furthermore, in one or more embodiments, the correction coefficients a, b, and Δc are calculated by modeling the feedback voltage $V_{FB}$ as a quadratic function of temperature, based on the feedback voltages $V_{FB1}$, $V_{FB2}$, and $V_{FB3}$ that are actually measured in control using the target initial voltage $V_{REF0}$ converted from the target initial value $D_{REF0}$ by DAC 22 in three different temperature environments (temperature $T_1$, $T_2$, $T_3$).

Furthermore, one or more embodiments may include a memory 23 that stores feedback voltages $V_{FB1}$, $V_{FB2}$, and $V_{FB3}$ as actual measured value, which are actually measured by control using the target initial voltage $V_{REF0}$ converted from the target initial value $D_{REF0}$ by DAC 22 under three different temperature environments (temperature $T_1$, $T_2$, and $T_3$), respectively, which is stored during pre-shipment inspection. The compensation calculator 24 calculates the correction coefficients a, b, and Δc by modeling the feedback voltage $V_{FB}$ as a quadratic function of temperature based on the measured values in the memory 23 (temperature $T_1$, $T_2$, and $T_3$, feedback voltage $V_{FB1}$, $V_{FB2}$, and $V_{FB3}$), and calculates compensation values using the calculated correction coefficients a, b, and Δc.

The calculation of the correction coefficients a, b, and Δc is not limited to the calculation described above. The correction coefficients a, b, and Δc may be calculated by the least-squares method or other methods. The measurement of feedback voltage in the IC inspection process is not limited to three different temperature environments, but may be increased to four different temperatures, five different temperatures, and so on.

Within the scope of the technical concept, one or more embodiments may be changed as appropriate. The number, position, shape, etc. of the above components are not limited to the above embodiments, but may be made to be any suitable number, position, shape, etc. The same component may be indicated with the same symbol in each figure.

The invention claimed is:

1. A direct current to direct current converter that controls an output voltage based on an error signal between a feedback voltage and a target voltage, comprising:
   a temperature sensor;
   a reference voltage generator circuit that generates a reference voltage;
   a compensation calculator that calculates a compensation value from a temperature detected from the temperature sensor using a function of temperature;
   a compensator that corrects a target initial value by the compensation value to generate a target value; and
   a digital-to-analog converter that converts the target value to the target voltage based on the reference voltage.

2. The direct current to direct current converter according to claim 1, further comprising
   a memory that stores at least one coefficient of the function as correction coefficient at a pre-shipment inspection, wherein
   the compensation calculator calculates the compensation value based on the correction coefficient in the memory.

3. The direct current to direct current converter according to claim 2, wherein
   the correction coefficient is calculated by modeling the feedback voltage as a function based on the feedback voltage measured by controlling using a target initial voltage converted from the target initial value by the digital-to-analog converter under a temperature environment.

4. The direct current to direct current converter according to claim 1, wherein
   the compensation calculator calculates the compensation value from a temperature detected from the temperature sensor using a quadratic function of temperature.

5. The direct current to direct current converter according to claim 4, further comprising
   a memory that stores coefficients of the quadratic function as correction coefficients at a pre-shipment inspection, wherein
   the compensation calculator calculates the compensation value based on the correction coefficients in the memory.

6. The direct current to direct current converter according to claim 5, wherein
   the correction coefficients are calculated by modeling the feedback voltage as the quadratic function based on the feedback voltage measured by controlling using a target initial voltage converted from the target initial value by the digital-to-analog converter, respectively, under three temperature environments.

7. The direct current to direct current converter according to claim 1, further comprising
   a memory that stores, at a pre-shipment inspection, the feedback voltage measured by controlling using a target initial voltage converted from the target initial value by the digital-to-analog converter in three temperature environments, wherein
   the compensation calculator calculates coefficients of a quadratic function of the feedback voltage modeled by the quadratic function as correction coefficients, and calculates the compensation value based on the correction coefficients.

8. The direct current to direct current converter according to claim 5, wherein
   the correction coefficients are calculated by modeling the feedback voltage based on the feedback voltage actually measured in control using a target initial voltage converted from the target initial value by the digital-to-analog converter in at least three different temperature environments, respectively.

9. The direct current to direct current converter according to claim 1, further comprising
   a memory that stores, at a pre-shipment inspection, the feedback voltage measured by controlling using a target initial voltage converted from the target initial value by the digital-to-analog converter in three different temperature environments, wherein
   the compensation calculator calculates coefficients of a quadratic function of the feedback voltage modeled by the quadratic function as correction coefficients, and calculates the compensation value based on the correction coefficients.

10. An integrated circuit that controls an output voltage of a direct current to direct current converter based on an error signal between a feedback voltage and a target voltage, comprising:
    a temperature sensor;
    a reference voltage generator circuit that generates a reference voltage;
    a compensation calculator that calculates a compensation value from a temperature detected from the temperature sensor using a quadratic function of temperature;
    a compensator that corrects a target initial value by the compensation value to generate a target value; and
    a digital-to-analog converter that converts the target value to the target voltage based on the reference voltage.

11. A target voltage generation circuit that generates a target voltage to be compared with a feedback voltage, comprising:
    a reference voltage generator circuit that generates a reference voltage;
    a compensation calculator that calculates a compensation value from a temperature detected from a temperature sensor using a quadratic function of temperature;
    a compensator that corrects a target initial value by the compensation value to generate a target value; and
    a digital-to-analog converter that converts the target value to the target voltage.

* * * * *